May 11, 1954  J. C. CARTER  2,678,066
FLUID FLOW CONTROL DEVICE
Filed May 15, 1951

INVENTOR.
James Coolidge Carter
BY
Kenyon & Kenyon
ATTORNEYS

Patented May 11, 1954

2,678,066

UNITED STATES PATENT OFFICE 2,678,066

FLUID FLOW CONTROL DEVICE

James Coolidge Carter, Pasadena, Calif., assignor to The J. C. Carter Company, Pasadena, Calif., a corporation of California Application May 15, 1951, Serial No. 226,496

4 Claims. (Cl. 138—45)

This invention relates to fluid flow control devices and particularly to such devices which may be employed to limit fluid flow under conditions which might become excessive, as in supplying gasoline to aircraft.

In many instances the facilities at a given base may be of a type intended to supply larger quantities of fuel than a given plane can take. In order to prevent damage it is therefore necessary to have some sort of flow regulator or limiter to protect against excessive flow.

One of the objects of this invention is to provide such a fluid flow regulating or limiting device which can be manufactured and serviced easily and inexpensively. Another object is to provide such a device in which it is unnecessary to provide carefully machined valve mechanisms or guiding mechanisms for valve members. Another object is to provide such a device in which balanced compression spring members serve as both guiding and suspending members for suspending an orifice in floating relationship in a casing. Another object is to provide such a device in which the spring member serves as the variable orifice or valve member to restrict flow should the volume thereof be excessive for the intended purpose. Another object is to provide such a device in which it is unnecessary to provide gaskets or other packing devices. Other objects and advantages will be apparent from the description of the preferred form of the invention which is shown in the accompanying drawings, in which Fig. 1 is a detailed sectional view through the fluid flow regulating device;

Figures 1, 3:
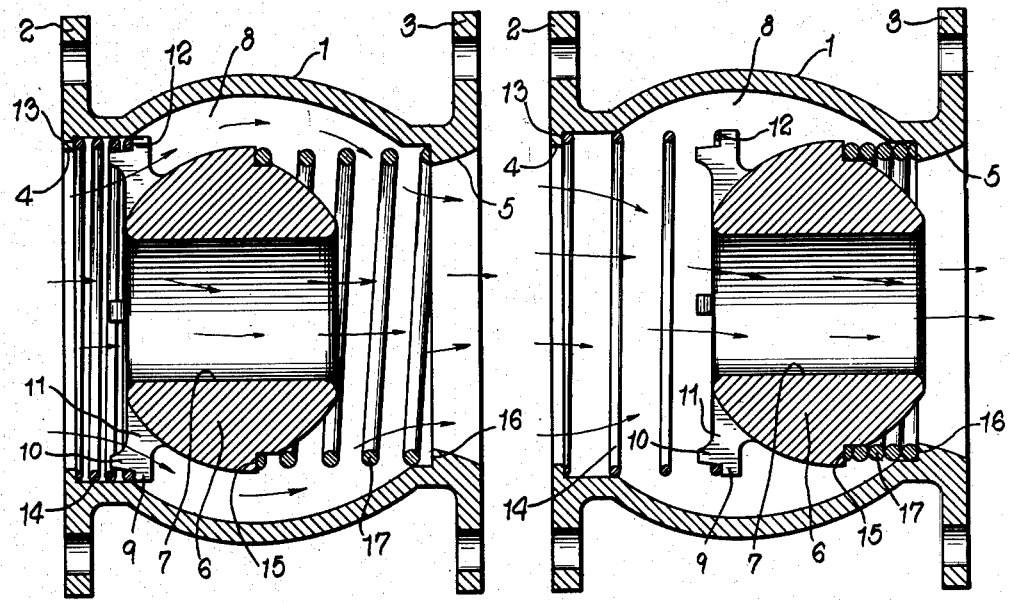
Fig. 3 is a view comparable to Fig. 1 showing the device in position to restrict the flow.
Figure 2:
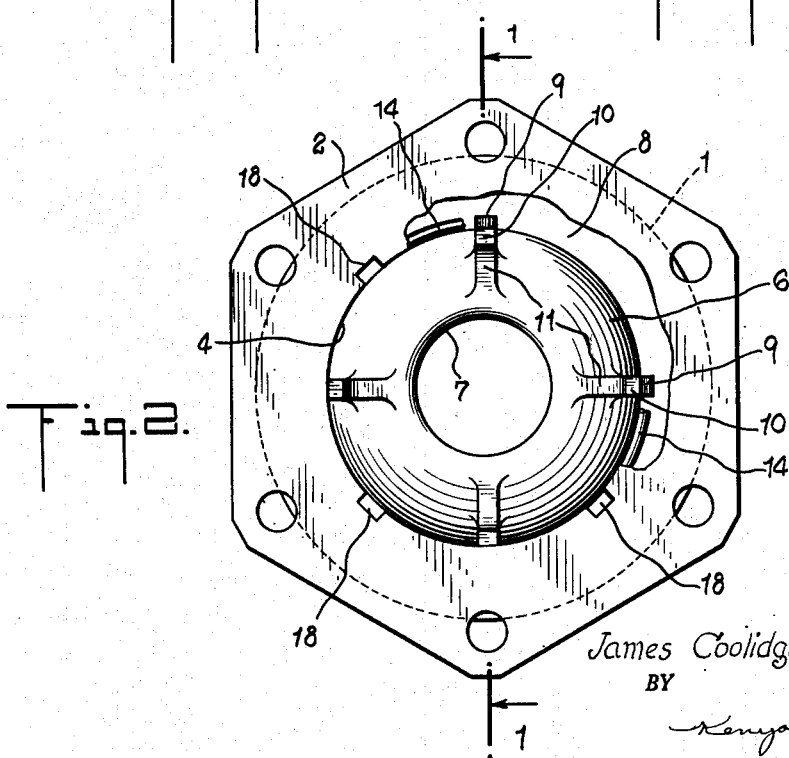
Fig. 2 is an end elevational view partly broken away at the inlet of the device.

The device, which is adapted to be installed in a fuel line of a plane, comprises a casing 1 which is preferably substantially spherical in form. It is provided with attaching flanges 2 and 3. There is a circular inlet 4 which is aligned with a circular outlet 5. An orifice member 6 is floatingly suspended in the casing for movement toward and away from the outlet 5. This member is preferably substantially cylindrical in form. It has a central orifice 7 which is cylindrical in form and is aligned with the inlet 4 and the outlet 5. It is of smaller cross section so that it can serve to restrict flow from the device.

The orifice member 6 is smaller than the inside of the casing and is in spaced relation thereto to provide a passage 8 between the inner walls of the casing and the orifice member 6.

Toward the inlet end of the orifice member is a spider 9, which consists of abutments 10 which are held in spaced relation to the orifice member by means of the spider arms 11. Seats 12 are provided on the abutments facing toward the inlet 4 which is provided with a seat 13 which faces inwardly. On this seat is a coil spring 14 which is substantially cylindrical in form. It is a compression spring and one end seats on the seat 12 and the other on the seat 13. A seat 15 is provided on the orifice member 6. It surrounds the central passage 7 and faces toward the outlet 5, where a seat 16 is provided around the outlet and facing inwardly. A coil compression spring 17 has one end seated on the seat 15 and the other end seated on the seat 16. This coil spring 17 is preferably cylindrical in form and is biased to force the orifice member 6 toward the inlet and it is stronger than the spring 14.

The spring members 14 and 17 serve to support and guide the orifice member 6 in its floating movement toward and away from the outlet 5. They eliminate the necessity for any further guiding members, and the spring 17 is so formed that when it is compressed its coils close around and come into contact with one another to close off the passage 8, thereby confining the flow to the central passage 7 in the orifice members 6. At positions intermediate the opening position shown in Fig. 1 and the closed position shown in Fig. 3, the spring 17 serves as a variable orifice, varying the cross section of flow possible from the passage 8. The inlet is notched at 18 to permit passage of the spider arms 11 and the orifice member 6 is smaller in diameter than the inlet 4 so that the device may be removed for servicing or replacement. When the orifice member has been inserted through the inlet the spring 14 is inserted.

In a typical fluid flow control device embodying the invention, the orifice 7 is made to accommodate a flow of 300 gallons per minute at a pressure of 50 pounds per square inch. When such a device is installed on a plane to control or limit flow into the gasoline tanks, it is possible to use a source of gasoline which delivers a greater volume at this pressure.

In the preferred form of the invention, the springs are so designed that when approximately 200 gallons of fuel are supplied per minute the hydraulic force bearing on the orifice piece thus moves it from the position shown in Fig. 1 to the position shown in Fig. 3.

When this device is used in connection with a fuel receiving system, it is possible to use fuel supplying equipment which is capable of delivering a greater volume of fuel than the receiving system is designed to receive. However, when the fuel supply system is delivering volumes of fuel which the fuel receiving system is capable of receiving, the pressure drop across the device is low and is increased only when the volume of fuel being supplied becomes excessive.

It is easy to install this device, which is unitary in its nature, and which can be made most inexpensively.

A preferred form of the invention has been described without, however, intending to limit the invention to the specific preferred form of the device.

I claim:

1. A fluid flow control device comprising a substantially spherical casing having circular aligned inlet and outlet openings, a substantially spherical orifice member in said casing and spaced from the walls thereof to provide a passage between said walls and orifice member and having an orifice aligned with and of smaller cross section than said inlet and outlet openings and having a first circular seat thereon and around said orifice and facing said outlet opening and a second seat facing said inlet opening and spaced from but attached to said orifice member by spider arms to form an annular opening for fluid flow therebetween of cross sectional area greater than that of said orifice and means for controlling flow and suspending said orifice member floatingly in said casing for movement toward and away from said outlet opening comprising a first compression coil spring having one end seated on said first seat and the other end seated around said outlet opening and a second compression coil spring having one end seated on said second seat and its other end seated around said inlet opening, said first coil spring being biased to overcome said second coil spring and having its coils disposed to engage one another on full compression to close said passage between said casing walls and orifice member.

2. A fluid flow control device comprising a casing having aligned inlet and outlet openings, an orifice member in said casing and spaced from the walls thereof to provide a passage between said walls and orifice member and having an orifice aligned with and of smaller cross section than said inlet and outlet openings and having a first seat thereon and around said orifice and facing said outlet opening and a second seat facing said inlet opening and spaced from but attached to said orifice member by spider arms to form an annular opening for fluid flow therebetween of cross sectional area greater than that of said orifice and means for controlling flow and suspending said orifice member floatingly in said casing for movement toward and away from said outlet opening comprising a first compression coil spring having one end seated on said first seat and the other end seated around said outlet opening and a second compression coil spring having one end seated on said second seat and its other end seated around said inlet opening, said first coil spring being biased to overcome said second coil spring and having its coils disposed to engage one another on full compression to close said passage between said casing walls and orifice member.

3. A fluid flow control device comprising a casing having aligned inlet and outlet openings, an orifice member in said casing and spaced from the walls thereof and having an orifice aligned with and of less size than said inlet and outlet openings and means for supporting said orifice member in spaced relation to said casing and to said openings to provide a passage between said casing and said orifice member between said inlet and outlet openings and for floating movement toward and away from said outlet comprising a pair of compression coil springs each bearing at one of its ends on said orifice member and one bearing around the outlet opening at one end of said spring and around the orifice of said orifice member at the other end of said spring and the other adjacent the inlet opening the coils of the spring adjacent said outlet opening being arranged to close together to restrict the passage between the casing and the orifice member to an area less than that of the orifice on movement of the orifice member toward said outlet opening with consequent compression of said spring.

4. A fluid flow control device comprising a casing having aligned inlet and outlet openings, an orifice member in said casing and spaced from the walls thereof and of greater size than said outlet opening and movable to a position adjacent said outlet opening to restrict the same and having an orifice aligned with and of less size than said inlet and outlet openings and means for supporting said orifice member normally in spaced relation to said casing and to said openings to provide a passage between said casing and said orifice member between said inlet and outlet openings and for floating movement toward and away from said outlet comprising a pair of springs each opposed to one another and biased to engage opposite sides of said orifice member to normally sustain it in its spaced relation to said outlet opening.

References Cited in the file of this patent

UNITED STATES PATENTS

| Number | Name | Date |
|---|---|---|
| 1,079,985 | Kaminsky | Dec. 2, 1913 |
| 2,324,402 | Kocher | July 13, 1943 |
| 2,330,127 | Lehmberg | Sept. 12, 1943 |
| 2,358,611 | Ziebolz | Sept. 19, 1944 |
| 2,451,387 | Horvuot | Oct. 12, 1948 |
| 2,464,942 | Ray | Mar. 22, 1949 |